(12) United States Patent
Kushiro et al.

(10) Patent No.: US 9,001,494 B2  
(45) Date of Patent: Apr. 7, 2015

(54) DIELECTRIC CERAMIC AND SINGLE-PLATE CAPACITOR

(71) Applicant: Murata Manufacturing Co., Ltd., Nagaokakyo-shi, Kyoto-Fu (JP)

(72) Inventors: Kazuji Kushiro, Nagaokakyo (JP); Tatsuya Ishikawa, Nagaokakyo (JP); Tomomitsu Yamanishi, Nagaokakyo (JP); Naoki Kawara, Nagaokakyo (JP)

(73) Assignee: Murata Manufacturing Co., Ltd., Nagaokakyo-Shi, Kyoto-fu (JP)

(*) Notice: Subject to any disclaimer, the term of this patent is extended or adjusted under 35 U.S.C. 154(b) by 0 days.

(21) Appl. No.: 14/093,767

(22) Filed: Dec. 2, 2013

(65) Prior Publication Data

US 2014/0092526 A1  Apr. 3, 2014

Related U.S. Application Data

(63) Continuation of application No. PCT/JP2012/061993, filed on May 10, 2012.

(30) Foreign Application Priority Data

Jun. 2, 2011 (JP) .................................. 2011-124026

(51) Int. Cl.
| | | |
|---|---|---|
| H01G 4/06 | (2006.01) | |
| H01G 4/12 | (2006.01) | |
| C04B 35/468 | (2006.01) | |
| C04B 35/626 | (2006.01) | |

(52) U.S. Cl.
CPC .......... *H01G 4/1227* (2013.01); *C04B 35/4682* (2013.01); *C04B 35/62685* (2013.01); *C04B 2235/3206* (2013.01); *C04B 2235/3208* (2013.01); *C04B 2235/3224* (2013.01); *C04B 2235/3225* (2013.01); *C04B 2235/3227* (2013.01); *C04B 2235/3262* (2013.01); *C04B 2235/3272* (2013.01); *C04B 2235/3275* (2013.01); *C04B 2235/79* (2013.01)

(58) Field of Classification Search
USPC .................. 361/321.1–321.5, 311, 135–137; 501/135–137
See application file for complete search history.

(56) References Cited

U.S. PATENT DOCUMENTS

| | | | | |
|---|---|---|---|---|
| 4,130,854 | A | * | 12/1978 | Hertz .............................. 361/304 |
| 4,312,023 | A | * | 1/1982 | Frappart et al. ............... 361/243 |
| 4,425,378 | A | * | 1/1984 | Maher ............................ 427/79 |
| 2008/0112109 | A1 | | 5/2008 | Muto et al. |
| 2010/0014210 | A1 | * | 1/2010 | Nakamura et al. ......... 361/301.4 |
| 2010/0165541 | A1 | | 7/2010 | Sasabayashi et al. |

FOREIGN PATENT DOCUMENTS

| | | |
|---|---|---|
| JP | 7-272972 | 10/1995 |
| JP | 2007-234677 A | 9/2007 |
| WO | WO 2006/132086 | 12/2006 |
| WO | WO 2009/037922 | 3/2009 |

OTHER PUBLICATIONS

PCT/JP2012/061993 ISR dated May 24, 2012.
PCT/JP2012/061993 Written Opinion dated May 24, 2012.
Yang, Jurrfeng et al.; "Grain boundary dielectric ceramics and the single layer chip capacitors"; Materials Research and Application, vol. 2, No. 3, Sep. 2008, © 1994-2014 China Academic Journal Electronic Publishing House (English translation of abstract attached).
Kim, S., et al., "Crystal structure of the epitaxial $BaTiO_3$ thin film on the MgO (100) substrate prepared by the coating-pyrolysis process", Journal of the Korean Association of Crystal Growth, vol. 10, No. 6, pp. 378-380 (2000).

* cited by examiner

*Primary Examiner* — Eric Thomas
(74) *Attorney, Agent, or Firm* — Dickstein Shapiro LLP

(57) ABSTRACT

A dielectric ceramic that contains, as its main constituent, a perovskite-type compound containing Ba and Ti, and, with respect to the Ti content of 100 parts by mole, contains Re1 (Re1 is at least one element of La and Nd) in the range of 0.15 to 3 parts by mole, Y in the range of 0.1 to 3 parts by mole, Mg in the range of 0.3 to 13 parts by mole, and Fe in the range of 0.01 to 5 parts by mole.

13 Claims, 1 Drawing Sheet

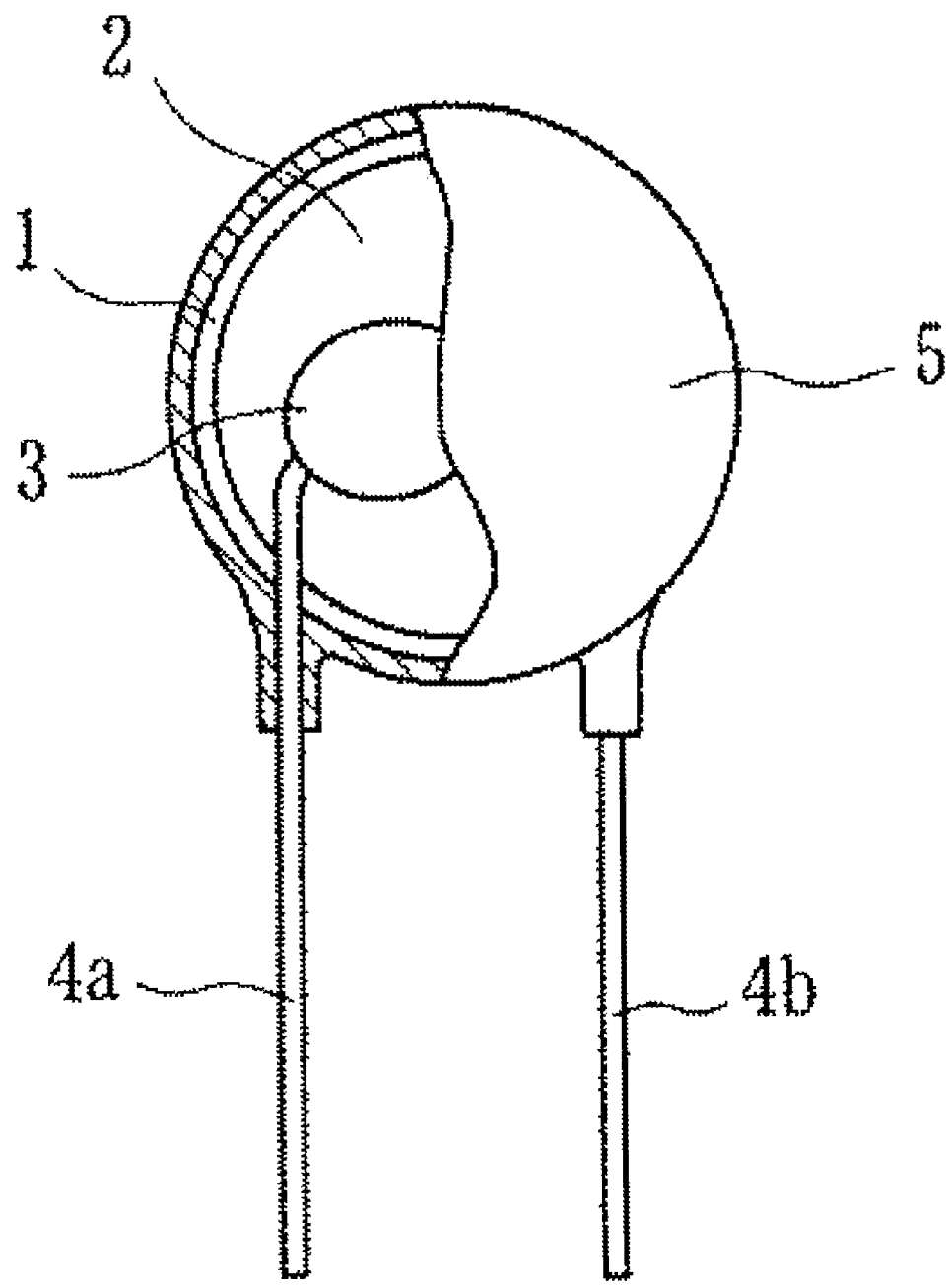

DIELECTRIC CERAMIC AND SINGLE-PLATE CAPACITOR

CROSS REFERENCE TO RELATED APPLICATIONS

The present application is a continuation of International application No. PCT/JP2012/061993, filed May 10, 2012, which claims priority to Japanese Patent Application No. 2011-124026, filed Jun. 2, 2011, the entire contents of each of which are incorporated herein by reference.

FIELD OF THE INVENTION

The present invention relates to a dielectric ceramic, and more particularly, to a dielectric ceramic for use in a capacitor intended for middle to high pressures.

BACKGROUND OF THE INVENTION

In recent years, suppressed electrostatic capacitance changes with temperature, as well as reductions in leakage current have been required for dielectric ceramics for use in capacitors intended for middle to high pressures (for example, direct-current rated voltages from 1 kV to 6 kV). The leakage current i is defined by the following formula (1) with the frequency f, capacitance C, and voltage V.

$$i = 2\pi f C V \qquad \text{Formula (1):}$$

From the formula (1), it is determined that the leakage current is increased with the increase in capacitance value C. Therefore, in particular, reductions in leakage current have been required for capacitors intended for middle to high pressures, which are high in capacitance value, and there is a need to improve dielectric ceramics for use in the capacitors in terms of insulation property.

Conventionally, the dielectric ceramic described in Patent Document 1 is known as a material that undergoes a small change in electrostatic capacitance with temperature. This dielectric ceramic is composed of a fired mixture of 100.0 parts by weight of a basic constituent and 0.2 to 5.0 parts by weight of an additive constituent, and the basic constituent is composed of a substance represented by $(1-\gamma-\eta)(\text{Ba}_{k-(x+y)}\text{M}_x\text{L}_y)\text{O}_k\text{TiO}_2 + \eta\text{JZrO}_3 + \gamma(\text{R}_{1-z}\text{R}'_z)\text{O}_{3/2} + \alpha\text{AO}_{5/2} + \beta\text{D}$ (M is Mg and/or Zn, L is Ca and/or Sr, J is Ca and/or Ba, R is one, or two or more elements selected from La, Ce, Pr, Nd, Pm, Sm, and Eu, R' is one, or two or more elements selected from Sc, Y, Gd, Tb, Dy, Ho, Er, Tm, Yb, and Lu, A is P and/or V, and D is one, or two or more oxides selected from Cr, Mn, Fe, Co, and Ni), whereas the additive constituent has $\text{Li}_2\text{O}$, $\text{SiO}_2$, and MO (MO is one, or two or more oxides selected from BaO, SrO, CaO, MgO, and ZnO).

Patent Document 1: Japanese Patent Application Laid-Open No. 7-272972

SUMMARY OF THE INVENTION

However, the dielectric ceramic mentioned above is a material for laminated ceramic capacitors including a base metal such as Ni as internal electrodes, and when this dielectric ceramic is used for capacitors intended for middle to high voltages, problems with reliability are caused after a moisture-resistance loading test.

The present invention has been achieved in view of the problems, and an object of the present invention is to provide a dielectric ceramic that undergoes a small change in electrostatic capacitance with temperature, and has favorable reliability after a moisture-resistance loading test, even when the ceramic is used for capacitors intended for middle to high voltages.

The dielectric ceramic according to the present invention contains, as its main constituent, a perovskite-type compound containing Ba and Ti, and further contains Re1 (Re1 is at least one element of La and Nd), Y, Mg, and Fe, and characteristically, when the content of Ti is 100 parts by mole, the content of Re1 is 0.15 to 3 parts by mole, the content of Y is 0.1 to 3 parts by mole, the content of Mg is 0.3 to 13 parts by mole, and the content of Fe is 0.01 to 5 parts by mole.

Furthermore, in the dielectric ceramic according to the present invention, preferably, the perovskite-type compound as the main constituent further optionally contains Ca, and the molar ratio $\alpha$ of Ba/(Ba+Ca) is $0.4 \leq \alpha \leq 1$.

Furthermore, in the dielectric ceramic according to the present invention, the perovskite-type compound as the main constituent is preferably barium titanate, and $\alpha=1$.

Furthermore, the dielectric ceramic according to the present invention is preferably obtained by firing in the atmosphere.

In addition, the present invention is also directed to a single-plate capacitor including: the dielectric ceramic mentioned above; and electrodes formed by a sputtering method on both principal surfaces of the dielectric ceramic.

According to the present invention, it is possible to provide a dielectric ceramic that undergoes a small change in electrostatic capacitance with temperature, and has favorable reliability after a moisture-resistance loading test, even when the ceramic is used for capacitors intended for middle to high voltages.

BRIEF EXPLANATION OF THE DRAWING

The FIGURE is a front view of a partially fractured single-plate capacitor.

DETAILED DESCRIPTION OF THE INVENTION

An embodiment for carrying out the present invention will be described below.

The FIGURE is a front view of a partially fractured single-plate capacitor as an example of an electronic component manufactured with the use of a dielectric ceramic according to the present invention. This single-plate capacitor is used in middle to high voltage applications, and provided with a dielectric ceramic 1, electrodes 2 formed on both principal surfaces of the dielectric ceramic 1, a pair of leads 4a, 4b electrically connected to the electrodes 2 with solder 3 interposed therebetween, and an exterior resin 5 covering the dielectric ceramic 1.

The dielectric ceramic according to the present invention contains, as its main constituent, a perovskite-type compound containing Ba and Ti. Further, with respect to the Ti content of 100 parts by mole, the ceramic contains Re1 (Re1 is at least one element of La and Nd) in the range of 0.15 to 3 parts by mole, Y in the range of 0.1 to 3 parts by mole, Mg in the range of 0.3 to 13 parts by mole, and Fe in the range of 0.01 to 5 parts by mole. In this case, a single-plate capacitor is achieved which undergoes a small change in electrostatic capacitance with time, and has favorable reliability after a moisture-resistance loading test.

Further, the dielectric ceramic according to the present invention may contain rare-earth elements, V, Al, Ni, etc., as long as the object of the present invention can be achieved.

In addition, there is no need for the A site, B site, and O amounts of the perovskite-type compound to meet the stoichiometric composition of 1:1:3, and the amounts may be deviated from the stoichiometric composition.

Next, a method for manufacturing the dielectric ceramic according to the present invention will be described with reference to the single-plate capacitor in the FIGURE as an example.

First, oxide and carbonate powders of Ba, Ca, and Ti are prepared as starting raw materials for the main constituent. These starting raw material powders are weighed, and subjected to mixing and grinding in a liquid with the use of media. After drying, the mixed powder obtained is subjected to a heat treatment, thereby providing a main constituent powder. This method is generally referred to as a solid-phase synthesis method, and wet synthesis methods such as a hydrothermal synthesis method, a hydrolysis method, and an oxalic acid method may be used as other methods.

Next, predetermined amounts of powders of La, Nd, Y, Mg, and Fe oxides, hydroxides, or carbohydrates are added to this main constituent powder. These powders are not to be considered limited to oxide powders, hydroxide powders, and carbohydrate powders, as long as the object of the present invention is achieved. Then, the powders are mixed in the liquid with the addition of a binder, and subjected to drying and granulation to obtain a ceramic raw material powder.

Next, the ceramic raw material powder described above is formed into a predetermined disk shape by a press forming method. Then, the obtained compact is subjected to firing at a predetermined temperature to obtain the dielectric ceramic 1.

Next, the electrodes 2 are formed on both principal surfaces of the dielectric ceramic 1. Examples of the method for forming the electrodes 2 include a sputtering method. Alternatively, the method may be other thin-film formation methods such as ion plating.

Next, the electrodes 2 and the leads 4a, 4b are connected with the solder 3 interposed therebetween. Thereafter, the exterior resin is formed by a resin molding method or the like. In accordance with the process described above, the single-plate capacitor is prepared.

EXPERIMENTAL EXAMPLE

First, powders of $BaCO_3$ and $TiO_2$ were weighed for predetermined molar quantities. Then, the powders were mixed in a ball mill, dried, and then subjected to calcination at 1100° C. for 2 hours to obtain a barium titanate powder as a perovskite-type compound. On the other hand, powders of $CaCO_3$ and $TiO_2$ were weighed for predetermined molar quantities. Then, the powders were mixed in a ball mill, dried, and then subjected to calcination at 1100° C. for 2 hours to obtain a calcium titanate powder as a perovskite-type compound.

Next, the calcium titanate powder and respective powders of $La_2O_3$, $Nd_2O_3$, $Ho_2O_3$, $Er_2O_3$, $Y_2O_3$, $Dy_2O_3$, $Mg(OH)_2$, $Fe_2O_3$, $MnCO_3$, and $Co_3O_4$ were weighed so as to have the proportions shown in Table 1 with respect to the obtained barium titanate powder, and mixed to obtain a mixture. It is to be noted that α in Table 1 refers to the molar ratio of (Ba content)/(total content of Ba and Ca) in the mixture. In addition, the (Ba, Ca)/Ti in Table 1 refers to the molar ratio of (total content of Ba and Ca)/(Ti content) in the mixture. In addition, the contents of Re1 (Re1=La, Nd, Ho, Er), Re2 (Re2=Y, Dy, Er, Ho), Mg, and M1 (M1=Fe, Mn, Co) in Table 1 refer to contents in terms of parts by mole with respect to 100 parts by mole of Ti in the mixture. This mixture was, with the addition of 10 weight % of a 50% vinyl acetate emulsion solution thereto, mixed in a ball mill. Thereafter, drying and granulation were carried out to obtain a ceramic raw material powder.

TABLE 1

| No. | α | (Ba,Ca)/Ti | Re1 Element | a (parts by mole) | Re2 Element | b (parts by mole) | Mg c (parts by mole) | M1 Element | d (parts by mole) |
|---|---|---|---|---|---|---|---|---|---|
| 1* | 1.0 | 1.00 | La | 0.05 | Y | 1.50 | 2.00 | Fe | 0.60 |
| 2 | 1.0 | 1.00 | La | 0.15 | Y | 1.50 | 2.00 | Fe | 0.60 |
| 3 | 1.0 | 1.00 | La | 0.25 | Y | 1.50 | 2.00 | Fe | 0.60 |
| 4 | 1.0 | 1.00 | La | 0.50 | Y | 1.50 | 2.00 | Fe | 0.60 |
| 5 | 1.0 | 1.00 | La | 1.50 | Y | 1.50 | 2.00 | Fe | 0.60 |
| 6 | 1.0 | 1.00 | La | 3.00 | Y | 1.50 | 2.00 | Fe | 0.60 |
| 7* | 1.0 | 1.00 | La | 0.25 | — | — | 2.00 | Fe | 0.60 |
| 8 | 1.0 | 1.00 | La | 0.25 | Y | 0.10 | 2.00 | Fe | 0.60 |
| 9 | 1.0 | 1.00 | La | 0.25 | Y | 1.00 | 2.00 | Fe | 0.60 |
| 10 | 1.0 | 1.00 | La | 0.25 | Y | 3.00 | 2.00 | Fe | 0.60 |
| 11 | 1.0 | 1.00 | Nd | 0.25 | Y | 1.50 | 2.00 | Fe | 0.60 |
| 12* | 1.0 | 1.00 | Ho | 0.25 | Y | 1.50 | 2.00 | Fe | 0.60 |
| 13* | 1.0 | 1.00 | Er | 0.25 | Y | 1.50 | 2.00 | Fe | 0.60 |
| 14* | 1.0 | 1.00 | La | 0.25 | Dy | 1.50 | 2.00 | Fe | 0.60 |
| 15* | 1.0 | 1.00 | La | 0.25 | Er | 1.50 | 2.00 | Fe | 0.60 |
| 16* | 1.0 | 1.00 | La | 0.25 | Ho | 1.50 | 2.00 | Fe | 0.60 |
| 17* | 1.0 | 1.00 | La | 0.50 | Y | 1.50 | 0.20 | Fe | 0.60 |
| 18 | 1.0 | 1.00 | La | 0.50 | Y | 1.50 | 0.30 | Fe | 0.60 |
| 19 | 1.0 | 1.00 | La | 0.50 | Y | 1.50 | 13.00 | Fe | 0.60 |
| 20* | 1.0 | 1.00 | La | 0.50 | Y | 1.50 | 15.00 | Fe | 0.60 |
| 21* | 1.0 | 1.00 | La | 0.50 | Y | 1.50 | 2.00 | — | — |
| 22 | 1.0 | 1.00 | La | 0.50 | Y | 1.50 | 2.00 | Fe | 0.01 |
| 23 | 1.0 | 1.00 | La | 0.50 | Y | 1.50 | 2.00 | Fe | 5.00 |
| 24* | 1.0 | 1.00 | La | 0.50 | Y | 1.50 | 2.00 | Fe | 6.00 |
| 25* | 1.0 | 1.00 | La | 0.50 | Y | 1.50 | 2.00 | Mn | 0.60 |
| 26* | 1.0 | 1.00 | La | 0.50 | Y | 1.50 | 2.00 | Co | 0.60 |
| 27 | 1.0 | 0.93 | La | 0.50 | Y | 1.50 | 2.00 | Fe | 0.60 |
| 28 | 1.0 | 1.10 | La | 0.50 | Y | 1.50 | 2.00 | Fe | 0.60 |
| 29 | 0.6 | 1.00 | La | 0.50 | Y | 1.50 | 2.00 | Fe | 0.60 |
| 30 | 0.4 | 1.00 | La | 0.50 | Y | 1.50 | 2.00 | Fe | 0.60 |

Sample numbers 1 to 6 have varying La contents. Sample numbers 7 to 10 have varying Y contents. Sample numbers 11 to 13 have varying types of Re1 element. Sample numbers 14 to 16 have varying types of Re2 element. Sample numbers 17 to 20 have varying Mg contents. Sample numbers 21 to 24 have varying Fe contents. Sample numbers 25 and 26 have varying types of M1 element. Sample numbers 27 and 28 have varying ratios of (Ba, Ca)/Ti. Sample numbers 29 and 30 have varying α values in $Ba\alpha Ca_{1-\alpha}TiO_3$.

Further, it was confirmed by an ICP emission spectrometric analysis that the obtained ceramic raw material powders are nearly identical to the prepared compositions shown in Table 1.

Next, this ceramic raw material powder was injected into a mold, and subjected to forming at a pressure of 1 ton/cm². Then, the obtained compact was subjected to firing at 1350° C. for 2 hours in the air atmosphere to obtain a disk-shaped dielectric ceramic of 8.3 mm in diameter and 1.0 mm in thickness.

Next, electrodes containing Cu as their main constituent were formed by a sputtering method on both principal surfaces of this dielectric ceramic.

For the dielectric ceramic with the electrodes formed, the dielectric constant (∈r), dielectric loss tangent (tan δ), and temperature characteristics of dielectric constant were measured under the following conditions.

The dielectric constant and dielectric loss tangent were measured at a temperature of 20° C. by applying an electric current from 1 Vrms at 1 kHz. As for the temperature characteristics of dielectric constant, two types of characteristics were measured: Y5R characteristics in accordance with EIA and B characteristics in accordance with JIS. In the case of the Y5R characteristics in accordance with EIA, the rate of change in dielectric constant in the temperature range of −30°

C. to +85° C. is supposed to fall within ±15%, with the dielectric constant at +20° C. as a standard. In addition, in the case of the B characteristics in accordance with JIS, the rate of change in dielectric constant in the temperature range of −25° C. to +85° C. is supposed to fall within ±10%, with the dielectric constant at +20° C. as a standard.

Next, the electrodes and the lead terminals were connected with solder. Thereafter, the dielectric ceramic was covered with an epoxy resin to obtain a single-plate capacitor.

It was confirmed by an ICP emission spectrometric analysis that the sintered dielectric ceramic dissolved in a solvent after the removal of the epoxy resin, lead terminals, and electrodes from the obtained single-plate capacitor has a nearly identical composition to that shown in Table 1.

This single-plate capacitor was subjected to a moisture-resistance loading test. In the moisture-resistance loading test, a voltage of 2.0 kVrms at 60 Hz was applied for 4000 hours under the conditions of 60° C. and a relative humidity from 90 to 95%.

Thereafter, the insulation resistance (IR) and AC voltage characteristics were measured for the samples with the respective conditions.

The insulation resistance was measured at a temperature of 20° C. by applying direct-current electricity at 500 V. A sample with an insulation resistance of $10 \times 10^{10} \Omega$ or more was regarded as a non-defective product.

In addition, as for the AC voltage characteristics, the alternating-current voltage was varied from 1 Vrms through 200 Vrms to 400 Vrms in a bath maintained at a temperature of +25° C. to figure out the rates of change in dielectric constant at 200 Vrms and 400 Vrms with respect to the dielectric constant at 1 Vrms. A sample with a rate of change in dielectric constant within 40% under the condition of 200 Vrms and within 55% under the condition of 400 Vrms was regarded as a non-defective product.

These evaluation results are shown in Table 2. It is to be noted that the samples with a mark * in Tables 1 and 2 fall outside the scope of the present invention.

TABLE 2

| | | | Initial Characteristics | | | | After Moisture-Resistance Loading Test (4000 hours) | | |
|---|---|---|---|---|---|---|---|---|---|
| | | | 25° C. Standard (Y5R) (%) | | 25° C. Standard (B) (%) | | IR | AC Voltage Characteristics (%) | |
| No. | εr | tan δ | −30° C. | +85° C. | −25° C. | +85° C. | $(\times 10^{10} \Omega)$ | 200 Vrms | 400 Vrms |
| 1* | 3420 | 0.97 | −10.1 | −4.3 | −9.2 | −3.8 | 170 | 50.2 | 65.3 |
| 2 | 3460 | 1.01 | −8.7 | −5.0 | −8.3 | −4.7 | 185 | 38.0 | 52.0 |
| 3 | 3470 | 1.00 | −8.5 | −6.1 | −8.2 | −5.2 | 195 | 35.2 | 48.0 |
| 4 | 3480 | 1.00 | −8.3 | −6.3 | −8.0 | −5.5 | 195 | 31.2 | 45.0 |
| 5 | 3500 | 1.11 | −7.4 | −9.1 | −6.8 | −8.4 | 175 | 28.5 | 42.5 |
| 6 | 3520 | 1.20 | −6.8 | −10.2 | −6.5 | −9.8 | 155 | 25.3 | 40.3 |
| 7* | 3550 | 1.15 | −10.3 | −6.5 | −9.5 | −5.7 | 170 | 42.5 | 57.0 |
| 8 | 3510 | 1.05 | −9.0 | −6.3 | −8.9 | −5.6 | 195 | 37.9 | 50.6 |
| 9 | 3490 | 1.05 | −8.7 | −6.3 | −8.5 | −5.4 | 180 | 36.8 | 48.9 |
| 10 | 3390 | 0.96 | −7.0 | −5.7 | −6.5 | −4.8 | 195 | 32.1 | 46.0 |
| 11 | 3400 | 0.95 | −7.0 | −5.0 | −6.5 | −4.5 | 190 | 39.0 | 54.0 |
| 12* | 3580 | 1.00 | −6.5 | −5.0 | −6.0 | −4.5 | 180 | −50.4 | −70.0 |
| 13* | 3600 | 1.05 | −7.0 | −4.0 | −6.8 | −3.8 | 170 | −51.3 | −72.0 |
| 14* | 3490 | 0.98 | −8.0 | −6.8 | −7.5 | −5.1 | 190 | 42.5 | 58.0 |
| 15* | 3480 | 1.00 | −9.0 | −6.0 | −8.8 | −4.9 | 180 | 42.0 | 57.0 |
| 16* | 3500 | 1.05 | −9.0 | −6.5 | −8.7 | −5.5 | 185 | 43.0 | 58.5 |
| 17* | 2850 | 2.30 | −26.8 | 52.5 | −26.0 | 53.1 | 95 | 59.6 | 79.5 |
| 18 | 3750 | 1.85 | −6.2 | −8.5 | −5.6 | −7.9 | 105 | 38.6 | 53.1 |
| 19 | 3020 | 0.86 | −9.9 | −6.2 | −9.5 | −5.4 | 200 | 27.4 | 36.9 |
| 20* | 2860 | 0.82 | −11.5 | −5.0 | −10.6 | −4.3 | 190 | 29.1 | 38.2 |
| 21* | 3790 | 1.65 | −3.2 | −10.8 | −2.5 | −10.1 | 100 | 41.5 | 58.6 |
| 22 | 3670 | 1.12 | −5.0 | −9.2 | −4.6 | −8.8 | 110 | 37.2 | 51.2 |
| 23 | 3050 | 1.10 | −9.8 | −6.3 | −9.2 | −5.5 | 110 | 25.5 | 36.7 |
| 24* | 2780 | 1.16 | −10.8 | −5.0 | −9.5 | −4.6 | 2 | 26.2 | 38.2 |
| 25* | 3500 | 1.16 | −10.9 | −4.8 | −9.6 | −4.6 | 2 | 25.0 | 35.4 |
| 26* | 3400 | 1.20 | −10.2 | −6.0 | −9.0 | −5.4 | 2 | 44.0 | 57.5 |
| 27 | 3620 | 1.25 | −5.2 | −10.1 | −4.6 | −9.6 | 185 | 36.5 | 45.3 |
| 28 | 3230 | 1.00 | −10.2 | −2.8 | −9.5 | −2.2 | 150 | 38.2 | 49.6 |
| 29 | 1450 | 0.96 | −8.5 | −5.4 | −8.0 | −5.0 | 195 | 28.0 | 43.0 |
| 30 | 1000 | 0.75 | −9.0 | −3.5 | −8.5 | −2.9 | 230 | 27.0 | 42.5 |

From the results in Table 2, it was demonstrated that the dielectric ceramic containing, as its main constituent, the perovskite-type compound containing Ba and Ti, and, with respect to the Ti content of 100 parts by mole, containing Re1 (Re1 is at least one element of La and Nd) in the range of 0.15 to 3 parts by mole, Y in the range of 0.1 to 3 parts by mole, Mg in the range of 0.3 to 13 parts by mole, and Fe in the range of 0.01 to 5 parts by mole satisfies the Y5R characteristics and the B characteristics, and has favorable insulation resistance and AC voltage characteristics after a moisture-resistance loading test.

DESCRIPTION OF REFERENCE SYMBOLS 1 dielectric ceramic
2 electrode
3 solder
4a, 4b lead
5 exterior resin

The invention claimed is:

1. A dielectric ceramic comprising:
   a main constituent of a perovskite-type compound containing Ba and Ti, and further comprising Re1, Y, Mg, and Fe, wherein
   Re1 is at least one element of La and Nd, and
   when the content of Ti is 100 parts by mole,
      the content of Re1 is 0.15 to 3 parts by mole,
      the content of Y is 0.1 to 3 parts by mole,
      the content of Mg is 0.3 to 13 parts by mole, and
      the content of Fe is 0.01 to 5 parts by mole.

2. The dielectric ceramic according to claim 1, wherein the perovskite-type compound further contains Ca.

3. The dielectric ceramic according to claim 2, wherein a molar ratio $\alpha$ of Ba/(Ba+Ca) is $0.4 \leq \alpha \leq 1$.

4. The dielectric ceramic according to claim 3, wherein the perovskite-type compound is barium titanate.

5. The dielectric ceramic according to claim 4, wherein $\alpha=1$.

6. The dielectric ceramic according to claim 1, wherein the dielectric ceramic is obtained by firing in the atmosphere.

7. A single-plate capacitor comprising:
   the dielectric ceramic according to claim 6; and
   electrodes on opposed principal surfaces of the dielectric ceramic.

8. The single-plate capacitor according to claim 7, wherein the electrodes are sputtered electrodes.

9. The dielectric ceramic according to claim 1, further comprising at least one of a rare-earth element, V and Al.

10. A single-plate capacitor comprising:
    the dielectric ceramic according to claim 1; and
    electrodes on opposed principal surfaces of the dielectric ceramic.

11. The single-plate capacitor according to claim 10, wherein the electrodes are sputtered electrodes.

12. The single-plate capacitor according to claim 10, further comprising a respective lead connected to each of the electrodes.

13. The single-plate capacitor according to claim 10, further comprising a resin coating covering the dielectric ceramic and the electrodes.

* * * * *